United States Patent
Bach et al.

(10) Patent No.: US 8,028,810 B2
(45) Date of Patent: Oct. 4, 2011

(54) DISK BRAKE

(75) Inventors: Uwe Bach, Niedernhausen (DE); Ralf Sundheim, Frankfurt (DE); Volker Van Aken, Niddatal (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 387 days.

(21) Appl. No.: 12/297,737

(22) PCT Filed: Apr. 10, 2007

(86) PCT No.: PCT/EP2007/053451
§ 371 (c)(1),
(2), (4) Date: Oct. 20, 2008

(87) PCT Pub. No.: WO2007/122100
PCT Pub. Date: Nov. 1, 2007

(65) Prior Publication Data
US 2009/0236187 A1 Sep. 24, 2009

(30) Foreign Application Priority Data

Apr. 20, 2006 (DE) .................. 10 2006 018 265
Feb. 9, 2007 (DE) .................. 10 2007 006 472

(51) Int. Cl.
*F16D 55/00* (2006.01)
(52) U.S. Cl. ................ 188/73.47; 188/73.39
(58) Field of Classification Search ............ 188/72.5, 188/73.32, 73.39, 250 B, 250 G
See application file for complete search history.

(56) References Cited

U.S. PATENT DOCUMENTS

| | | | | |
|---|---|---|---|---|
| 3,611,988 A | * | 10/1971 | Hess | 188/72.5 |
| 4,911,878 A | | 3/1990 | Hopperdietzel | |
| 5,103,939 A | | 4/1992 | Schroeter | |
| 5,249,649 A | * | 10/1993 | Emmons | 188/73.47 |
| 5,363,944 A | * | 11/1994 | Thiel et al. | 188/73.31 |
| 5,868,233 A | | 2/1999 | Montalvo et al. | |
| 7,137,488 B2 | * | 11/2006 | Gilliland | 188/73.47 |
| 7,757,822 B2 | * | 7/2010 | Reeves | 188/72.5 |
| 2002/0038743 A1 | * | 4/2002 | Yoshimoto | 188/250 R |

(Continued)

FOREIGN PATENT DOCUMENTS

DE 195 30 407 A1 2/1997
(Continued)

OTHER PUBLICATIONS

Patent Abstract of Japan Publciation No. 11063041 dated Mar. 5, 1999.

*Primary Examiner* — Christopher Schwartz
(74) *Attorney, Agent, or Firm* — RatnerPrestia

(57) ABSTRACT

A disk brake having a brake caliper, which engages axially in a U shape around a rotatable brake disk is provided. The disk brake includes a caliper bridge, two caliper limbs and at least one actuating device. At least one brake lining is mounted in an axially movable fashion in the brake caliper. The caliper bridge has, in the peripheral direction, at least three substantially axially extending supports, wherein two of the supports are embodied as a main support and one support is embodied as a central support. These supports connect the two caliper limbs and in the process form two windows and axially project beyond the brake disk. The central support projects both beyond the brake disk and beyond the brake lining in the axial direction.

20 Claims, 6 Drawing Sheets

U.S. PATENT DOCUMENTS

2006/0070828 A1    4/2006    Hendrich et al.

FOREIGN PATENT DOCUMENTS

| | | |
|---|---|---|
| DE | 198 06 056 A1 | 8/1998 |
| DE | 101 13 347 A1 | 12/2001 |
| DE | 102 60 829 A1 | 7/2003 |
| DE | 102 33 446 A1 | 2/2004 |
| EP | 0 412 541 A1 | 8/1990 |
| EP | 0 412 541 A1 | 2/1991 |
| EP | 1 069 332 A2 | 1/2001 |
| GB | 2 258 506 | 2/1993 |
| GB | 2 258 506 A | 2/1993 |
| JP | 1-163041 | 6/1989 |
| WO | WO 00/65247 | 11/2000 |

\* cited by examiner

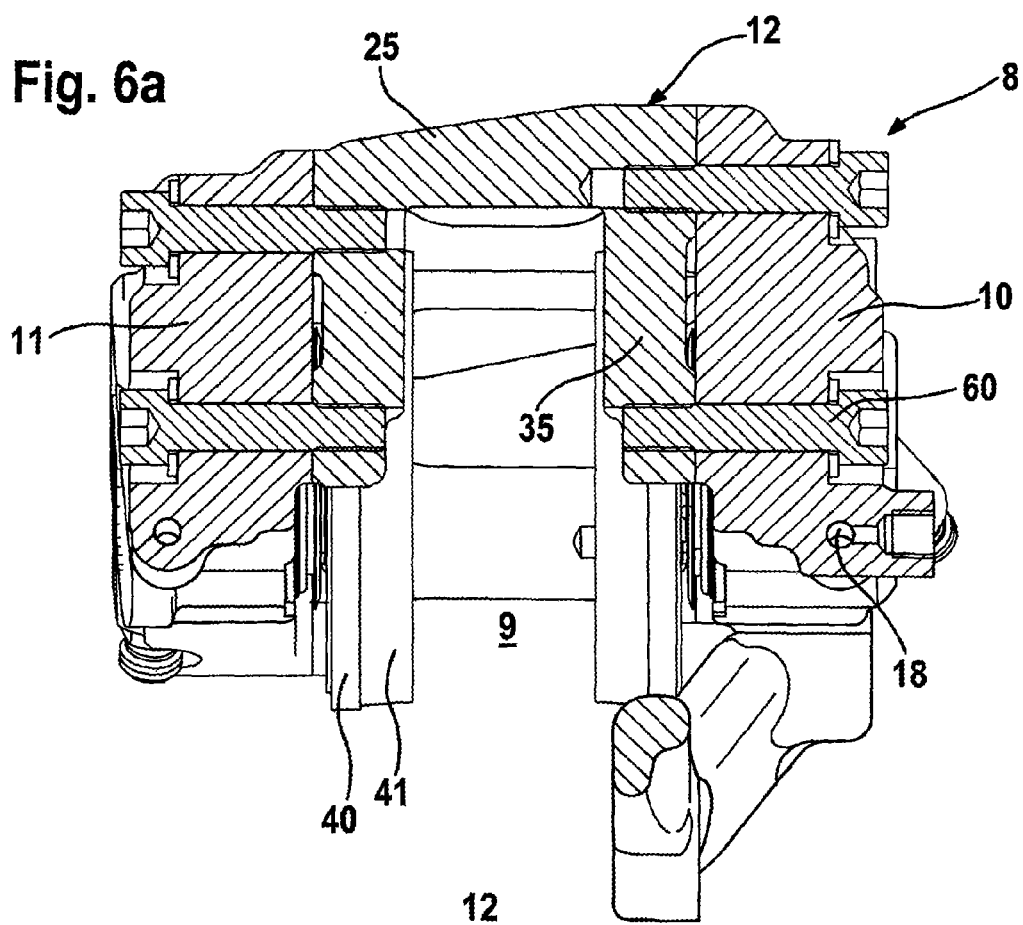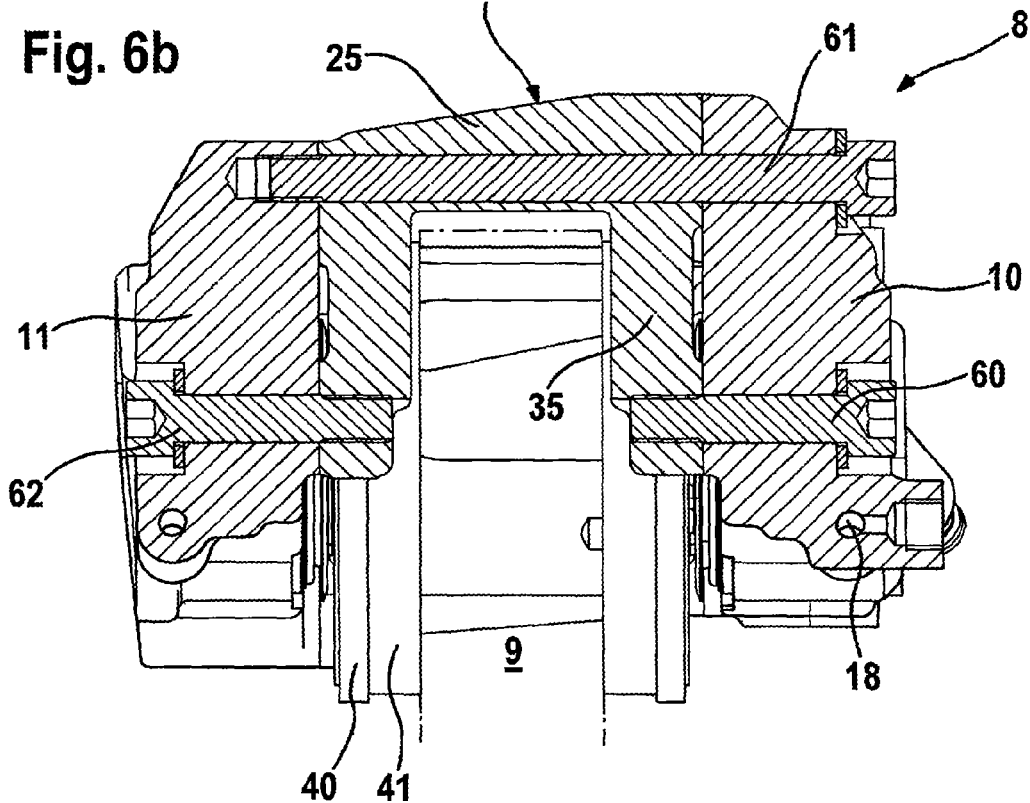

DISK BRAKE

CROSS REFERENCE TO RELATED APPLICATIONS

This application is the U.S. national phase application of PCT International Application No. PCT/EP2007/053451, filed Apr. 10, 2007, which claims priority to German Patent Application No. DE102006018265.0, filed Apr. 20, 2006 and German Patent Application No. DE102007006472.3, filed Feb. 9, 2007, the contents of such applications being incorporated by reference herein in their entirety.

BACKGROUND OF THE INVENTION

1. Field of the Invention

The invention relates to a disk brake having a brake caliper.

2. Description of the Related Art

DE 195 30 407 A1 discloses a disk brake which has a fixed caliper with caliper limbs and a caliper bridge. The caliper bridge is constructed here in the form of screws which function as a support and which connect the caliper limbs. Such brakes require a relatively large installation space in the radial and peripheral directions. In a disk brake it has a positive effect on the braking power and performance if the radius of the brake disk is selected to be as large as possible since in this way a high braking torque with low peripheral force can be achieved. The maximum diameter of a brake disk and the corresponding radius on which the brake linings act are determined by the internal diameter of the rim.

Furthermore, DE 101 13 347 A1 discloses a disk brake in which the caliper bridge is embodied in the form of supports, and a central support in the middle serves to support the brake lining.

SUMMARY OF THE INVENTION

An object of the invention is to specify a brake disk and a brake lining which avoid the disadvantages of the prior art and, in particular, require little space.

The object is achieved in that a radial wall thickness of the central support of the caliper bridge is designed in such a way that in an axial region of the brake linings a distance between the central support and a rotational axis of the brake disk is smaller than an external radius of the brake disk. This means that the wall thickness in the region where the central support projects beyond only the brake lining is greater than where the central support engages over the brake disk. The central support is therefore strengthened by the axially projected overlap of the brake disk and central support at the junction region between the caliper limb and caliper bridge. This proves very favorable since in this junction region the loading of the components, in particular due to notch stresses, is significantly greater than in the region of the brake disk. This design of the caliper bridge which is compatible with loading and optimized provides the advantage that the diameter of the brake disk can be designed in a maximum way. The structure of the caliper bridge with supports and windows permits good thermal irradiation of the components, as a result of which the thermal stress is kept low.

As a result of the fact that the main supports and the central support enclose the brake disk in a U shape in an axial direction, the brake disk is enclosed by the brake caliper in a way which, as it were, rounds it off and harmonizes stress. This leads to an optimum flow of force in the brake caliper and therefore to a high rigidity to prevent bending when the brake is actuated.

The brake linings are supported on bridge limbs in the peripheral direction and in the radial direction, wherein the bridge limbs are arranged on the main supports of the caliper bridge. In this context, an undercut is provided on at least one inlet-side bridge limb with respect to the brake lining. This comprises stops for the brake lining to bear against in the peripheral direction, and a supporting means for radially supporting the brake lining. The brake lining comprises a back plate and a friction lining, wherein the back plate has a rear region having two projections which adjoin in the peripheral direction. At least one of the projections is embodied in an L shape with a supporting face for providing radial support and two bearing faces for permitting bearing in the peripheral direction. The L-shaped projection engages in the undercut of the bridge limb. This type of bearing for a brake lining in the brake caliper is easy to fabricate and brings about a comfortable braking behavior.

In terms of the requirement of installation space in the peripheral direction it proves very favorable if the undercut is provided exclusively on the inlet side, with respect to a main rotational direction of the brake disk, for each brake lining in the brake caliper, and the back plate has an L-shaped projection exclusively on the inlet side, with the result that a flow of force of peripheral forces from the back plate into the brake caliper occurs by means of tension via a bearing face and a stop when the brake disk rotates in the main rotational direction, and occurs by means of pressure via a further stop and a further bearing face when the brake disk rotates in a direction opposed to the main rotational direction. The terms "on the inlet side and on the outlet side" are related to any existing brake lining in this context. This design of the bearing of the brake lining ensures that the guiding of the brake lining under tension results in a favorable braking behavior in terms of generation of noise and wear for forward travel of the vehicle. For less frequent reversing or for the stationary stage of the vehicle, the brake linings are loaded compressively. This effective application of the lining guiding principle under tension and under compression which is specifically matched to the requirements provides the advantage that the installation space of the brake caliper is considerably reduced in the peripheral direction of the brake disk since there is no need for any outlet-side undercut design. In addition, the double effect is obtained that the requirement of material and the requirement of working is decisively reduced both for the brake caliper and for the back plate of the brake lining. In particular in the case of fixed calipers, this concept is particularly simple and advantageous since said components are in principle made very rigid and therefore the reduced guidance of the lining which is present can be applied without disadvantages.

One advantageous development of the invention comprises a stop and a supporting means being provided on the outlet-side bridge limb, as a result of which the brake lining can be supported radially by means of the supporting faces. The stops which serve to provide support in the peripheral direction in the brake caliper are spaced apart in such a way that when the brake disk rotates in the main rotational direction, exclusively the inlet-side stop of the undercut and the bearing face of the L-shaped projection are in engagement when there are moderate peripheral forces induced by braking. When there are high peripheral forces, the outlet-side projection of the brake lining additionally bears against the stop of the outlet-side bridge limb since both the inlet-side bridge limb is deformed and the back plate of the brake lining becomes longer. A gap which is present between the brake lining and an outlet-side stop is overcome by means of the deformation, with the result that force can be conducted away proportionally into the outlet-side bridge limb (pull-push principle).

In a further refinement of the invention, a supporting face is provided on the central support of the caliper bridge, which supporting face bounds, through interaction with the supporting means in the bridge limbs, a possible movement of the brake lining in the radial direction with play in the brake caliper. Furthermore, a rear supporting face which interacts with the supporting face of the central support is provided on the brake lining, which rear supporting face is arranged on a side of the rear region facing away from the rotational axis of the brake disk, and substantially centrally between the projections. In this context, a recess, which at least partially accommodates the central support, is preferably provided in the brake lining and in this recess the rear supporting face is arranged. The radial support of the brake lining at a third point in the caliper bridge prevents undesired movements of the brake lining and therefore associated disadvantages in terms of braking comfort. The use of the third supporting face is particularly advantageous in the present guiding system of the brake linings since the one-sided design of the L-shaped projection permits the brake lining to carry out certain movements which are restricted by the rear supporting face and the corresponding face in the caliper bridge. The radial play of this mounting of the brake lining can be selected to be relatively small in the case of a fixed caliper since the caliper bridge and supporting means in the means for guiding the lining are in a fixed geometric ratio to one another. Play of the order of magnitude of 0.3-0.5 mm is appropriate here. If it is intended that further means should be active between the brake lining and the caliper bridge, the play can be between 0.5 and 1 mm.

A further embodiment of the invention comprises at least two pairs of brake linings being provided one next to the other in the peripheral direction in the brake caliper in order to act axially on both sides of the brake disk. Such high-performance disk brakes have the decisive advantage over brakes with just one large pair of brake linings that the brake linings wear evenly since the brake linings are acted on by only one actuating device, have bearings which are independent of one another and are thermally isolated. As a result, especially the mechanical loading of the force supports in the peripheral direction is reduced, which makes the dimensions and the weight of the components lower. This also improves the axial mobility in the brake caliper and therefore also the comfort properties of the brake linings. The favorable support of the brake linings by means of the undercuts and the stops makes a compact and short design of the brake caliper possible, in particular in the peripheral direction.

The installation space in the peripheral direction can be used particularly effectively if the undercut is provided for accommodating the outlet-side brake lining on a central bridge limb, to which at the same time the stop for the inlet-side brake lining is also attached. This means that the outlet-side stop for the inlet-side brake lining is attached to the same bridge limb on which the inlet-side undercut for the outlet-side brake lining is also provided. It should be borne in mind that on the one hand the term "inlet-side and outlet-side" for indicating the position of the undercut and of the stop in the brake caliper relates to the respective brake lining but is also used to describe the position of the brake linings and then refers to the brake caliper itself. The bridge limbs are preferably embodied in one piece on and with the caliper bridge in such a way that the caliper bridge and bridge limb have a U-shaped contour which engages around the brake disk. In this context, the caliper bridge and caliper limbs can be manufactured from a lightweight material, and the caliper bridge can be manufactured from a stronger material than the caliper limbs. Since the caliper bridge has to support completely the actuation forces which are applied by the actuating devices, they can be manufactured from a relatively high strength material, such as for example nodular graphite cast iron, owing to the favorable multi-component design of the brake caliper. In order to reduce the weight, the caliper limbs are manufactured from aluminum, for example.

Furthermore, the rigidity of the brake caliper can be increased further by including the U-shaped design of the caliper bridge and the bridge limbs in the loadbearing structure. Since the caliper limbs are screwed to the caliper bridge and the bridge limbs at two radially different locations, the actuation forces of the actuating device are also supported via the bridge limbs.

Within the scope of the present invention, a brake lining for a disk brake having a brake caliper is also disclosed, wherein the brake caliper engages axially in a U shape around a rotatable brake disk. Furthermore, the brake caliper comprises a caliper bridge, two caliper limbs and at least one actuating device. The brake lining is mounted in an axially movable fashion in the brake caliper and comprises a back plate and a friction lining which is arranged thereon.

The brake lining according to aspects of the invention has, in this context, a recess in the back plate and in the friction lining, which recess at least partially accommodates the central support. In a more favorable way, the caliper bridge can have, in a peripheral direction, at least three substantially axially extending supports. The supports are embodied here as two main supports and one central support which connect the caliper limbs forming two windows and axially project beyond the brake disk. The central support also axially projects beyond the brake lining with respect to the brake disk and is accommodated on both sides by the recess in the peripheral direction.

Furthermore, the brake lining comprises a back plate and a friction lining, wherein the back plate has a rear region with two projections which adjoin in the peripheral direction. At least one projection is embodied here in an L shape with a supporting face for providing radial support, and with two bearing faces for permitting bearing in a peripheral direction. The L-shaped shoulder engages in an undercut in the caliper bridge, with the other projection having a further bearing face and a supporting face. In this way, the brake lining permits the brake caliper and the disk brake to be designed in a way which is advantageous and is optimized in terms of installation space. It is conceivable to embody the L-shaped projection exclusively on the inlet side, with respect to a main rotational direction of the brake disk, on the rear region of each back plate. In this way, the brake lining is under tension and the flow of force of the peripheral forces from the back plate into the brake caliper occurs via the bearing face which extends radially on the L-shaped projection and faces the rear region, when the brake disk rotates in the main rotational direction. When the brake disk rotates in a direction opposed to the main rotational direction, the flow of force occurs by means of pressure via the bearing face facing away from the rear region. However, the outlet-side shoulder of the back plate can also have an L-shaped contour. Peripheral forces are therefore conducted away from the brake lining into the brake caliper by means of tension irrespective of the rotational direction of the brake disk.

In one refinement of the invention, a rear supporting face can be provided on the rear region of the back plate, which rear supporting face bounds, through interaction with the supporting faces of the projections, a possible movement of the brake lining in the radial direction with play in the brake caliper. This rear supporting face which functions as a radial support can either enter into contact with the caliper bridge during normal operation of the disk brake or serve only as an emergency bounding means, in particular if further means are active between the brake lining and the caliper bridge.

If the disk brake has two pairs of brake linings, in which case two brake linings can respectively act one next to the other in the peripheral direction on each side of the brake disk, it is advantageous in terms of the manufacturing costs if at least two brake linings are embodied in the same way.

The described design of a brake caliper and of a brake lining can be applied in a disk brake with a fixed caliper or with a floating caliper.

These and other aspects of the invention are illustrated in detail by way of the embodiments and are described with respect to the embodiments in the following, making reference to the Figures.

BRIEF DESCRIPTION OF THE DRAWINGS

The invention is best understood from the following detailed description when read in connection with the accompanying drawing. Included in the drawing are the following figures.

DETAILED DESCRIPTION OF THE PREFERRED EMBODIMENTS

Figure 1:
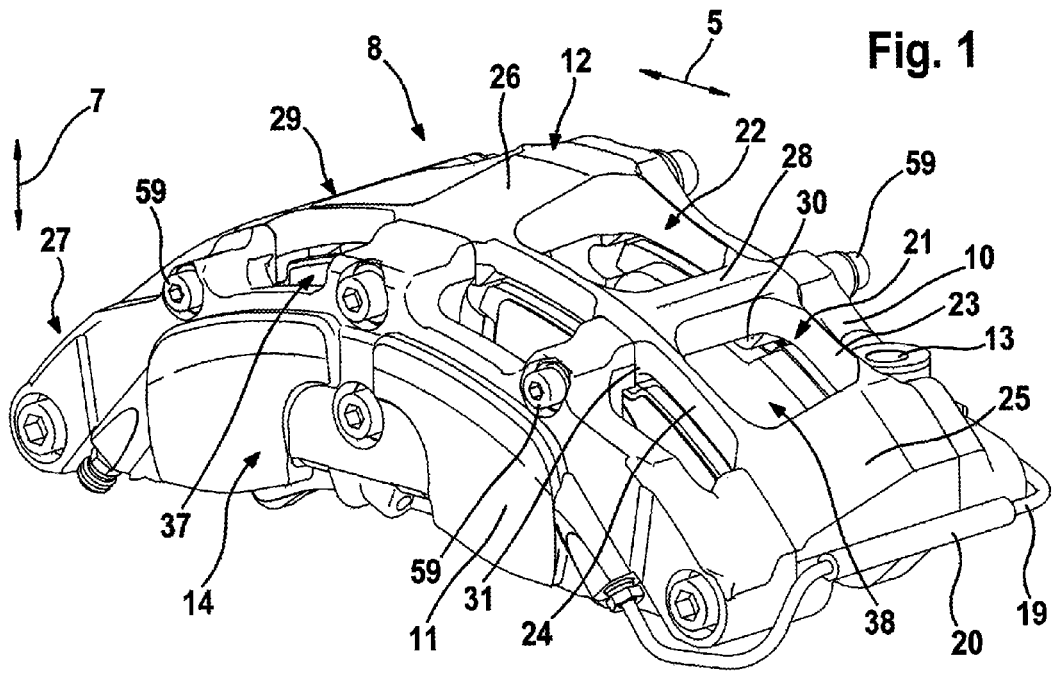
FIG. 1 is a perspective view of a brake caliper of a first embodiment of a disk brake.
Figure 2:
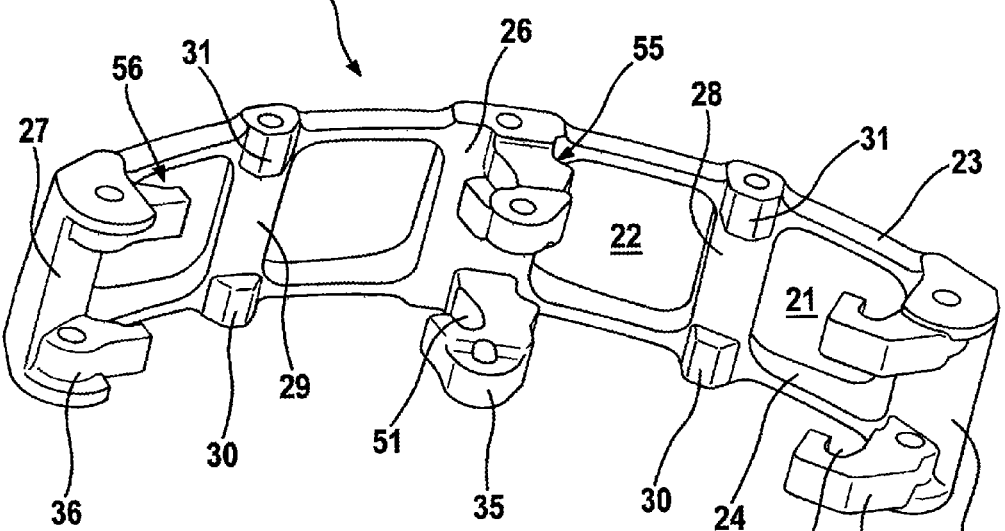
FIG. 2 is a perspective view into the caliper bridge of the disk brake according to FIG. 1.

FIG. 1 to FIG. 6 show a first embodiment of a disk brake 1. This disk brake 1 comprises a brake caliper 8 which is embodied as a fixed caliper and which can be mounted permanently on a vehicle limb (not illustrated). In the mounted state, the brake caliper 8 engages axially around a brake disk 2 which is mounted so as to be capable of rotating about a rotational axis 3. In this context, the brake disk 2 runs through a shaft 9 extending through the brake caliper 8 in the peripheral direction 5, said shaft 9 being formed by a first caliper limb 10 facing the vehicle, a caliper bridge 12 and a second caliper limb 11 facing away from the vehicle. In the present case, the caliper limbs 10, 11 and the caliper bridge 12 are embodied as different components and are connected to one another by means of screws. It is also conceivable to embody the brake caliper in one piece. Substantially radially extending bores 13, by means of which the brake caliper 8 can be connected to the vehicle limb, are provided on the first caliper limb 10.

Two actuating devices 14, which each have a piston 16 which can be moved in a bore 15, are respectively provided in each caliper limb 10, 11. Between the pistons 16 and the bores 15 pressure spaces 17 are formed. All four pressure spaces 17 of the actuating devices 14 are connected to one another hydraulically, with the pressure spaces 17 in the same caliper limb 10 or 11 being connected by means of a branch bore 18, and a pressure pipe 19 being additionally provided between the pressure spaces 17 of the two caliper limbs 10, 11. In this context, the pressure pipe 12 is shielded from thermal and mechanical stresses from the brake disk 2 by means of a protective insulation 20.

The caliper bridge 12 is configured as a support frame structure with radial windows 21, 22, with two webs 23, 24 which extend in the peripheral direction being connected to axially extending supports, and therefore surrounding the windows 23, 24. It is necessary to differentiate between main supports 25, 26, 27 and central supports 28, 29 since the main supports 25, 26, 27 are made stronger than the central supports 28, 29. The main supports 25, 26, 27 form, together with permanently connected bridge limbs 34, 35, 36, U-shaped units which enclose the brake disk 2. Receptacles for the brake linings 37, 38 are arranged on the bridge limbs 34, 35, 36 and as a result are mounted in such a way that they can be moved in the axial direction 6, and are mounted in the peripheral direction 5 and in the radial direction 7. According to a main rotational direction 4 of the brake disk 2, which corresponds to the forward travel of a motor vehicle, it is possible to refer here in each case to an inlet-side and outlet-side pair of brake linings 37, 38.

Figure 4:
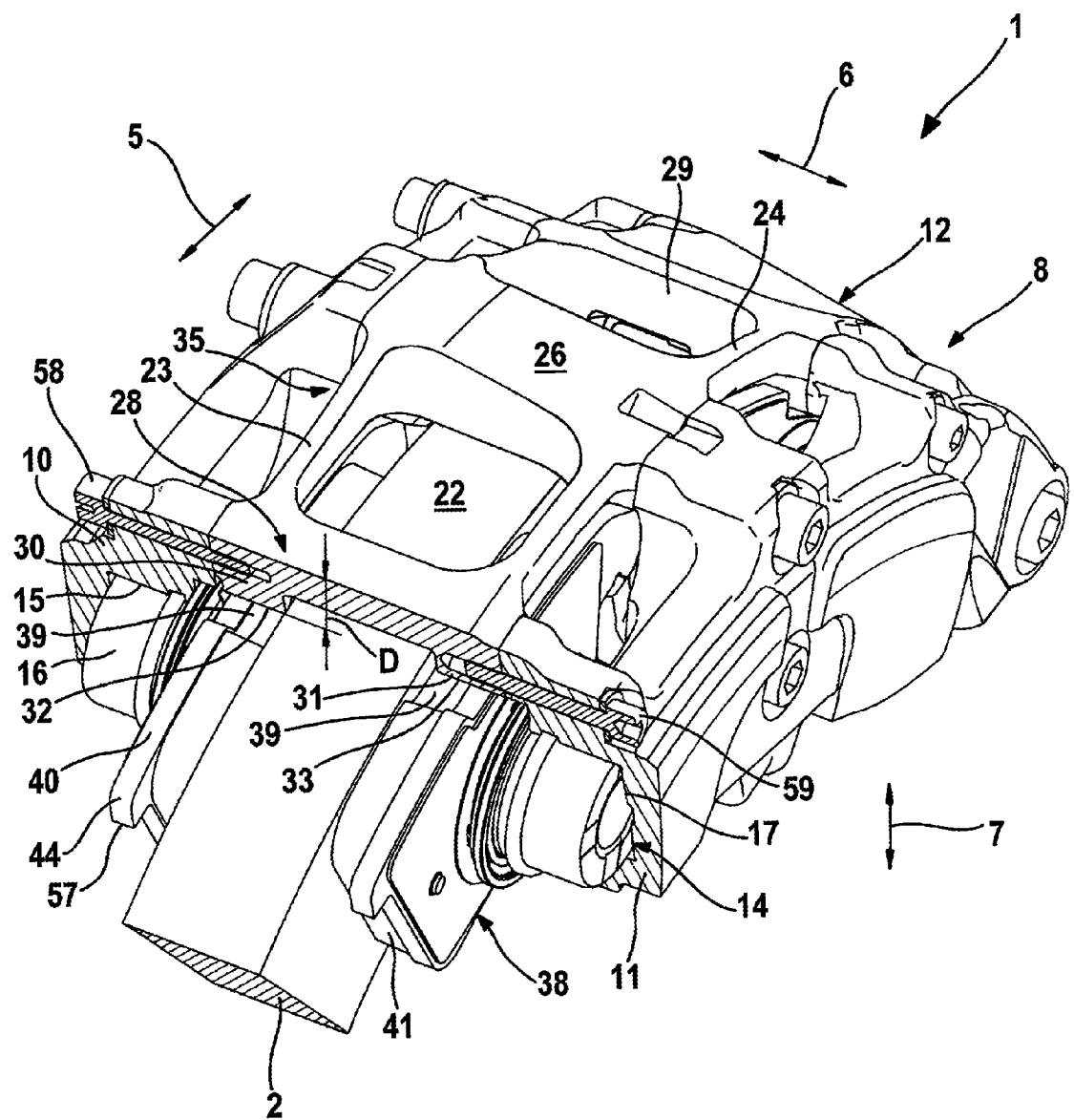
FIG. 4 shows a perspective partial section through the disk brake according to FIG. 1, FIGS. 5a) and b) show detailed sections of the guidance of the brake lining of the disk brake according to FIG. 1, and analogously for the embodiments in FIG. 7 and FIG. 8, FIG. 6a) shows a cross section through the disk brake according to FIG. 1, and FIG. 6b) shows a cross section through a disk brake similar to the disk brake according to FIG. 1.
Figure 5A:
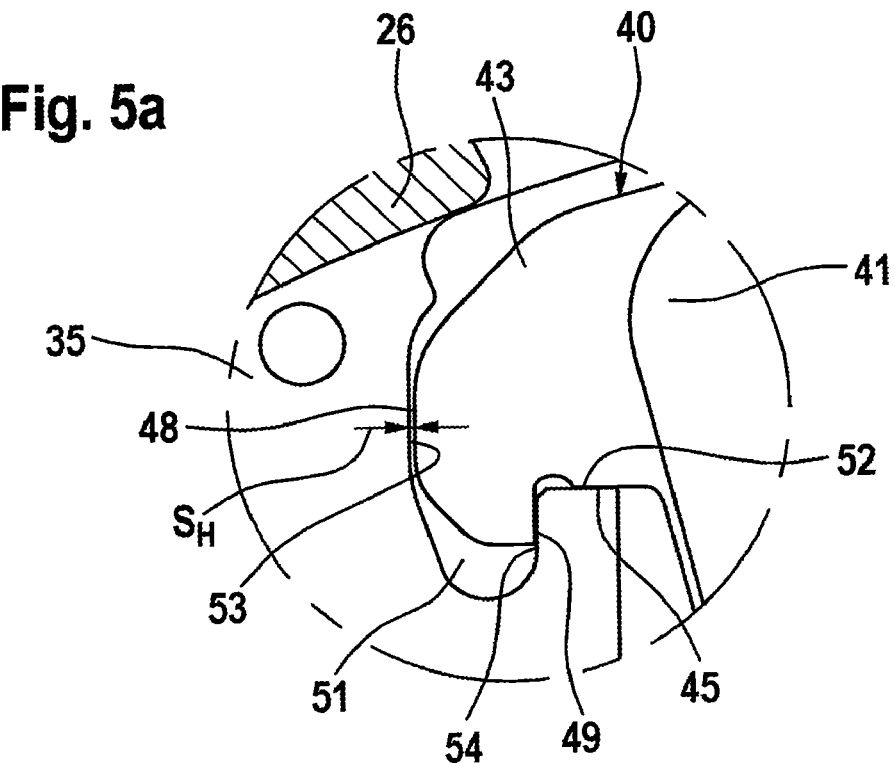
Figure 5B:
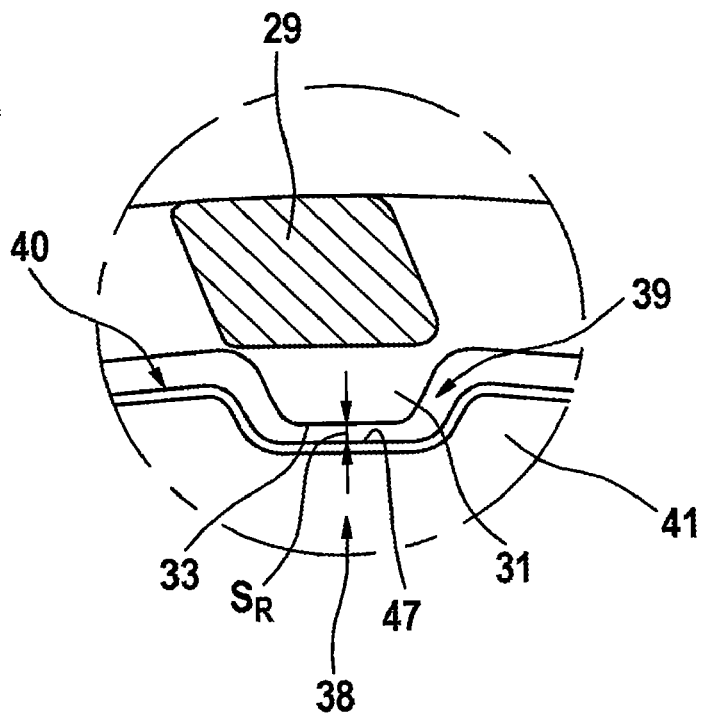

The central supports 28, 29 are arranged between the main supports 25, 26, 27 and project beyond the brake disk 2 and the brake linings 37, 38. FIG. 4 shows particularly well the way in which the central supports 28, 29 are arranged and embodied. It is clear here that the radial wall thickness D varies over the axial length of the central supports 28, 29. In order to increase the flexural strength of the entire brake caliper 2, the central supports 28, 29 are made stronger at the junction with the caliper limbs 10, 11 by means of a thickened portion 30, 31 than where they project beyond the brake disk 2. This is due to the fact that the junction region is subjected to particularly high mechanical stress. Furthermore, the region with the thickened portion 30, 31 is particularly well suited for accommodating the connecting screws 58, 59. The different wall thickness D acts over the axial extent of the central supports 28, 29 that the brake disk 2 is also enclosed in a U shape by the central supports 28, 29, with no clearly defined bridge limbs being present here. This U-shaped design of the central supports 28, 29 pointing to the rotational axis 3 is advantageous for making the external radius R of the brake disk 2, and therefore also the effective radius of the brake linings 37, 38 and the peripheral force, as large as possible. The thickened region of the central supports 28, 29 therefore projects axially into the region of the frictional engagement of the brake linings 37, 38. A distance A between the thickened region of the central supports 28, 29, in particular between the face of this region facing the rotational axis 3, and the rotational axis 3 of the brake disk 2 is therefore smaller than the external radius R of the brake disk 2. In order to avoid this, an external radius of a brake disk would have to be reduced by the amount of thickening of the central supports if the external dimensions of the disk brake which are conditioned by an internal diameter of a rim are to be constant. The advantageous overlap gives rise to a recess 39 in the brake linings 37, 38 in which the thickened portion 30, 31 of the central supports 28, 29 can be accommodated. This recess 39 reduces the frictional area only to an insignificant degree. This is therefore a highly effective configuration of the brake caliper 8 according to which only regions which are subjected to high mechanical stress are embodied in accordance with the loading, and at the same time optimum utilization of installation space is realized.

The brake linings 37, 38 are mounted so as to be axially movable in the receptacles in the caliper bridge 12. In the text which follows, inlet-side and outlet-side positions are referred to in order to describe the bearing with respect to one of the main rotational directions 4. This can relate both to a position relative to a brake lining and to the position of a brake lining in the brake caliper. All the brake linings 37, 38 comprise a back plate 40 and a friction lining 41 which is permanently connected thereto and which is preferably pressed thereon. The back plate 40 has a rear region 42 which is continuous in the peripheral direction 5 with, in each case, one projection 43, 44, the recess 39 for accommodating the thickened portion 30, 31 of the central supports 28, 29 being provided in the rear region 42 and in the friction lining 41. In the present exemplary embodiment, the inlet-side projection 43 is embodied in an L shape with a supporting face 45 for providing radial support and two bearing faces 48, 49 for permitting bearing in the peripheral direction 5. A supporting face 46 for providing radial support is present on the outlet-side projection 44.

Figure 3:
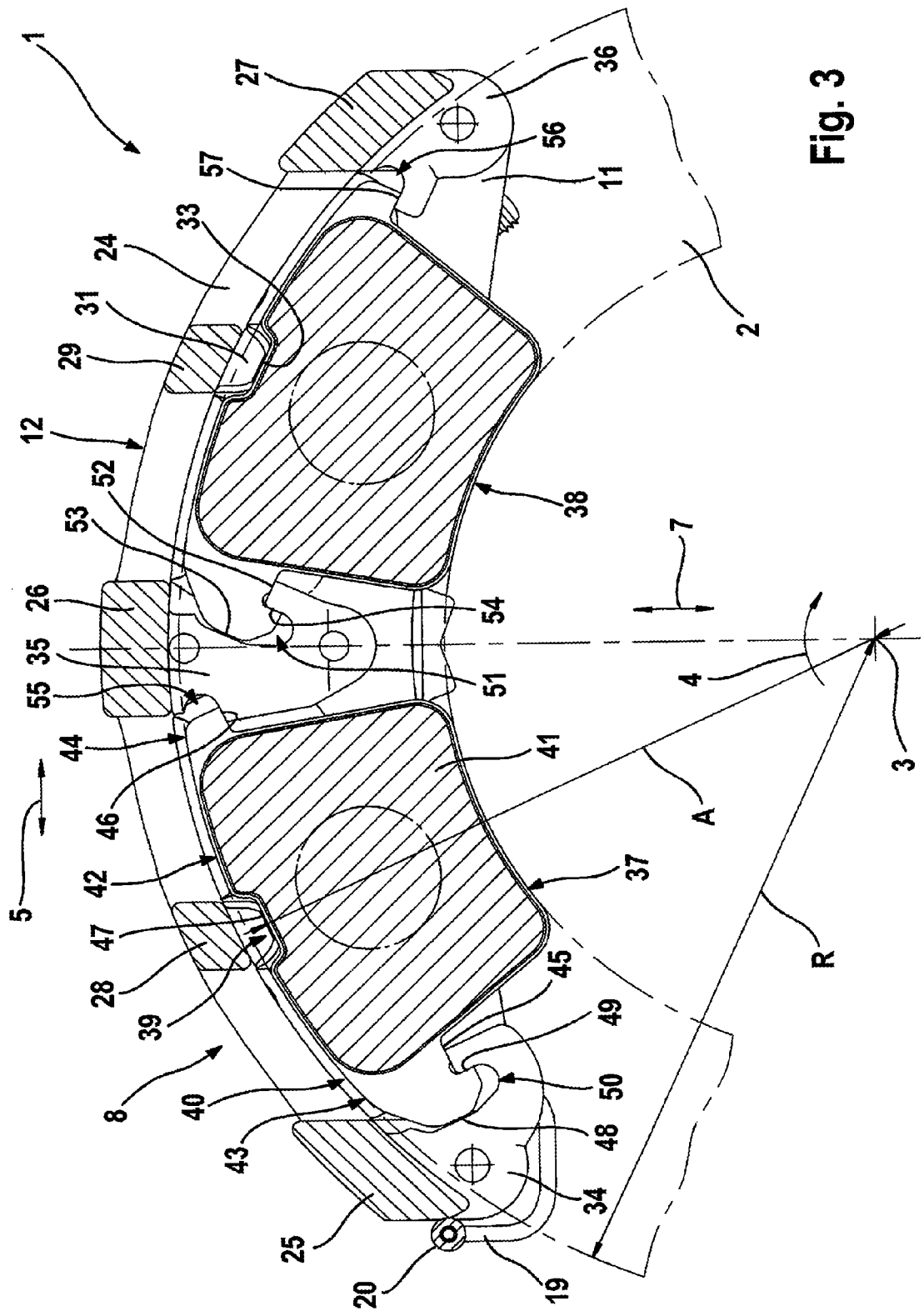
FIG. 3 shows a longitudinal section through the disk brake according to FIG. 1.

As is shown in FIG. 3, the inlet-side receptacles for the brake linings 37, 38 are formed in the inlet-side bridge limbs 34 and in the middle bridge limbs 35 as undercuts 50, 51 into which the L-shaped projections 43 of the brake linings 37, 38 engage. Each undercut 50, 51 has a supporting means 52 for providing radial support and in each case two stops 53, 54 for permitting bearing in the peripheral direction 5. The outlet-side receptacles 55, 56 for the brake linings 37, 38 are provided on the middle bridge limbs 35 and on the outlet-side bridge limbs 36 in the form of a supporting means 57.

Each brake lining 37, 38 is supported in the radial direction 7 by means of the inlet-side undercut 50, 51 and the outlet-side receptacle 55, 56. In this context, the supporting face 45 on the inlet-side projection 43 of a brake lining 37, 38 interacts with the supporting means 52 of the undercut 50, 51, and the supporting face 46 of the outlet-side projection 44 of a brake lining 37, 38 interacts with the supporting means 57 of the receptacle 56, 57. As is clarified in FIG. 5b by way of example and in a detailed form using the example of the central support 29, there is, in the recess 39 in the rear region 42, a rear supporting face 47 which limits the possible movement of the brake lining 37, 38 in the radial direction 7, together with the supporting face 32, 33 of the central support 28, 29 with play $S_R$. The play $S_R$ is preferably of the magnitude of 0.3-0.5 mm. The bearing for the brake linings 37, 38 in the peripheral direction 5 is provided by means of the stops 53, 54 in the undercuts 50, 51 through interaction with the bearing faces 48, 49 on the inlet-side projections 43 of the brake linings 37, 38. This is shown by way of example in FIG. 5a in a detailed section of the undercut 51 in the middle bridge limb 35 with the inlet-side projection 43 of the brake lining 38. The internal dimension in the peripheral direction 5 of the undercut 51 is somewhat larger than the L-shaped projection 43, with the result that play $S_H$ of 0.3-0.6 mm is produced in the peripheral direction 5.

When the disk brake 1 is actuated, the pressure spaces 17 of the actuating devices 14 in the caliper limbs 10, 11 are applied, as a result of which the respective piston 16 moves axially and presses the corresponding brake lining 10, 11 against the brake disk 2. If the brake disk 2 rotates in the main rotational direction 4, the resulting peripheral force causes the bearing faces 49, facing the brake lining, of the L-shaped projections 43 of the brake linings 10, 11 to move into engagement with the stops 54, facing away from the brake lining, of the undercuts 50, 51. The peripheral force is therefore conducted away into the brake caliper 8 via the bridge limbs 34, 35 by means of brake linings 37, 38 under tension.

In the case of reversing, the brake linings 37, 38 bear, with the bearing faces 48 facing away from the brake lining, against the stops 53 facing the brake lining, as a result of which the peripheral forces are applied to the brake caliper 8 by means of pressure.

FIGS. 6a and 6b illustrate the brake caliper 8 in an axial section which passes through the central main support 26 and the bridge limbs 35. Said figures show how the U-shaped design of the caliper bridge 12 and the bridge limbs 35 increases the rigidity of the brake caliper 8 further by virtue of the fact that said components are included in the loadbearing structure. As a result of the screwing of the caliper limbs 10, 11 to the caliper bridge 12 and the bridge limbs 35 at two radially different locations, the actuation forces of the actuating devices 14 are also supported via the bridge limbs 35. In FIG. 6b, a different form of screwing is implemented which reduces the number of screws and in particular uses one continuous screw 61 instead of two individual screws, leading to simplified mounting.

Figure 7:
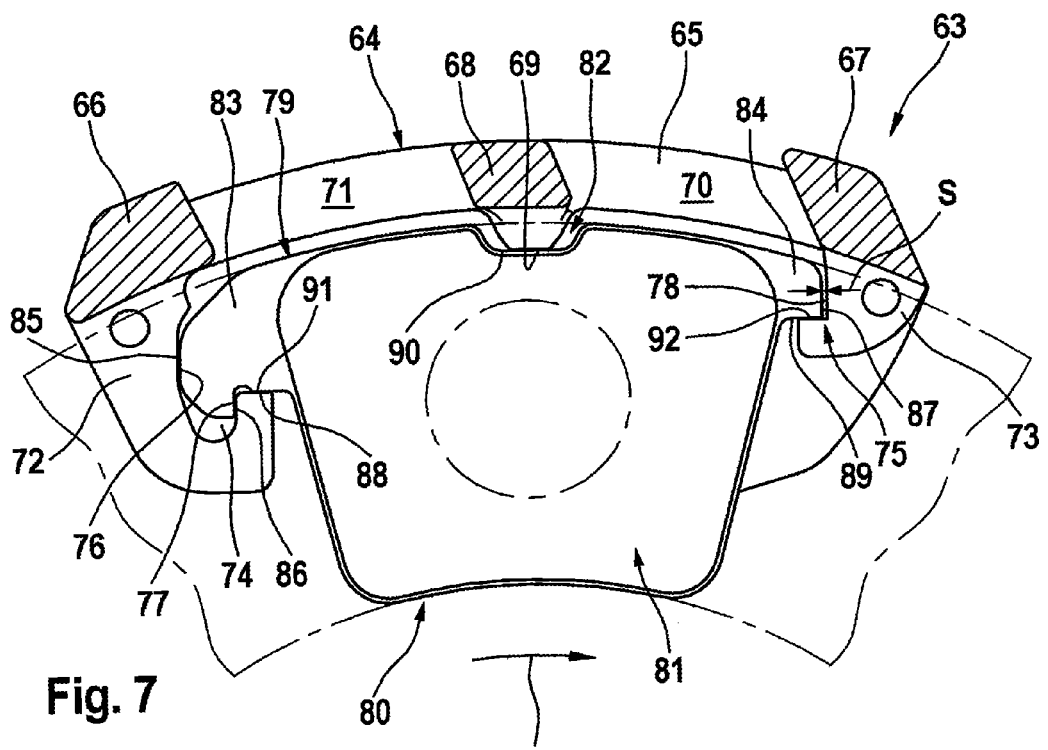
FIG. 7 shows a longitudinal section through a second embodiment of a disk brake.

FIG. 7 shows another exemplary embodiment of a brake caliper 63 which is analogous to the first exemplary embodiment but has modified bearing of the brake lining 80 in the peripheral direction 5 and only one pair of brake linings 80. Two caliper limbs engage over a brake disk 2 by means of a caliper bridge 64, the caliper bridge 64 having two webs 65, two main supports 66, 67 and a central support 68, as a result of which two radial windows 70, 71 are formed. In contrast to the first embodiment a bearing face 87 is provided on the outlet-side projection 84 of the brake lining 80, and a stop 78 is provided in the outlet-side receptacle 75 of the outlet-side bridge limb 73. In this context, the bearing face 86, facing the brake lining, of the inlet-side projection 83 of the brake lining 80 and the bearing face 87 of the outlet-side projection 84 are spaced apart in such a way that in the static state or in the case of weak braking the brake lining 80 is supported exclusively under tension in the undercut 74 in the inlet-side bridge limb 72 when the brake disk 2 rotates in the main rotational direction 4. As a result, a gap S of approximately 0.5-0.6 mm is produced between the brake lining 80 and the corresponding stops 76, 78 of the bridge limbs 72, 73. Weak braking is to be understood here as meaning a braking operation in which less than approximately 40% of the maximum braking power is required. In the case of strong braking, the geometric conditions between the brake lining 80 and the undercut 74 and the receptacle 75 change to the effect that as a result of the peripheral force the inlet-side bridge limb 72 deforms elastically and the brake lining 80 is stretched. This results in the gap S closing and the back plate 79 of the brake lining 80 coming to bear with the bearing face 87 against the outlet-side stop 78. Part of the peripheral force is therefore applied to the outlet-side receptacle 75. The division of the flow of force in terms of strength of braking has the effect that in the case of weak braking the advantages of brake linings and tension, in particular in terms of comfort, are exploited, and in the case of strong braking the advantages of brake linings which are supported by means of tension and by means of pressure for stability are also provided. In the case of reversing, the brake lining 80 bears with the bearing face 85 against the stop 75 of the undercut 74, as a result of which peripheral forces are transmitted into the brake caliper 63 by means of pressure.

Figure 8:
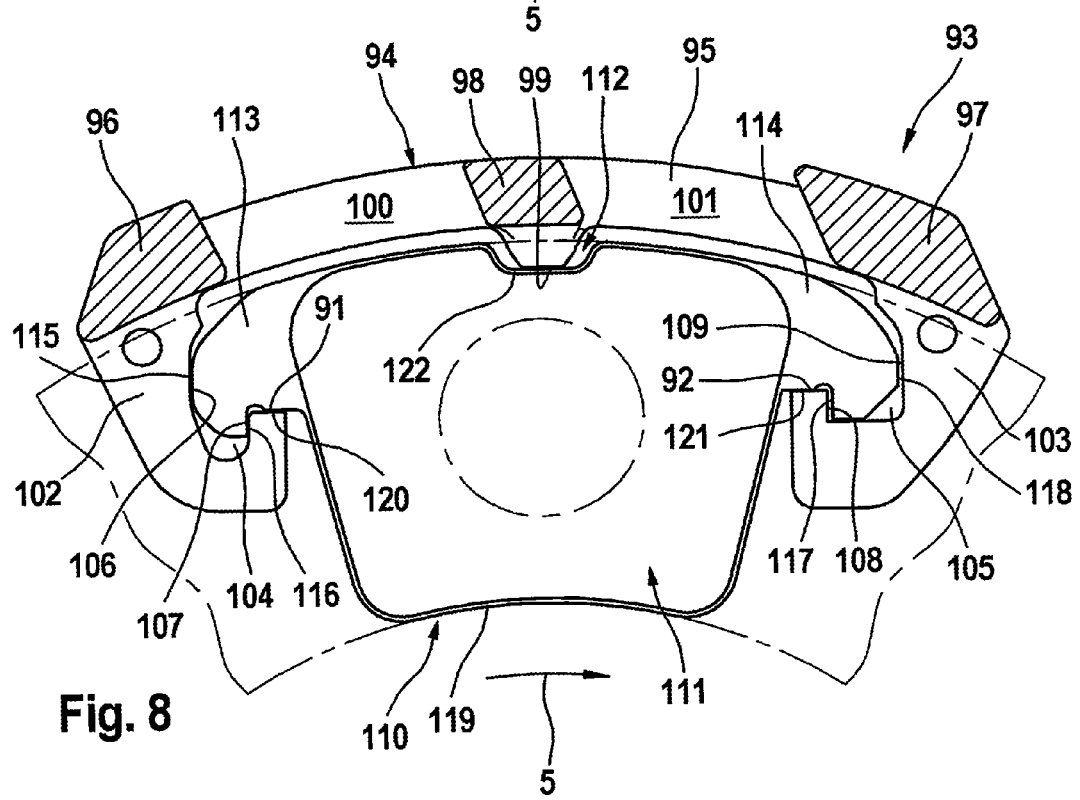
FIG. 8 shows a longitudinal section through a third embodiment of a disk brake.

FIG. 8 shows a further exemplary embodiment of a brake caliper 93, the brake lining 110 being provided on both sides with L-shaped projections 113, 114 and correspondingly an undercut 104, 105 also being provided in each of the inlet-side and outlet-side bridge limbs 102, 103. This design of the projections 113, 114 means that the brake lining 110 is mounted independently of the rotational direction.

The radial mounting of the brake linings 80, 110 in the brake calipers 63, 93 according to the exemplary embodiments in FIGS. 7 and 8 is of analogous design, for which reason a common description and common numbering have been selected. Supporting means 91, 92, on which the supporting faces 88, 89, 120, 121 of the brake linings 80, 110 are supported, are provided in the receptacle 75 and in the undercuts 74, 104, 105. In this context, the recesses 82, 112 in the rear region 81, 111 of the brake linings 80, 110 partially accommodate the central support 68, 98 and bound the possible radial movement of the brake calipers 80, 110 with play $S_R$ by virtue of the fact that the rear supporting face 90, 122 and the supporting face 69, 99 on the central support 68, 98 interact.

It is to be noted that the types of bearing from the first, second and third exemplary embodiments can be freely combined.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A disk brake having a brake caliper which axially engages a rotatable brake disk along a U-shaped engagement region, said disk brake comprising:
a caliper bridge;
two caliper limbs positioned on opposing sides of the caliper bridge;
at least one actuating device that is mounted in the brake caliper for axially moving at least one brake lining against the rotatable brake disk;
wherein the caliper bridge has, in a peripheral direction, at least three substantially axially extending supports including two main supports and one central support which axially project beyond the brake disk for connecting the caliper limbs to the caliper bridge, wherein a window is defined between adjacent supports,
bridge limbs arranged on the main supports of the caliper bridge on which the brake lining is supported in the peripheral direction and in a radial direction;
an undercut provided on at least one inlet-side bridge limb with respect to the brake lining, which undercut comprises stops for the brake lining to bear against in the peripheral direction, and a supporting means for radially supporting the brake lining,
wherein the central support axially projects beyond the brake disk and the brake lining, and a radial wall thickness (D) of the central support is sized such that a radial distance (A) between the central support and a rotational axis of the brake disk is less than an external radius (R) of the brake disk in an axial region of the brake lining.

2. The disk brake as claimed in claim 1, wherein the brake lining comprises a back plate and a friction lining, wherein the back plate has a rear region having two projections which adjoin in the peripheral direction, wherein at least one projection is embodied in an L-shape with a supporting face for providing radial support and two bearing faces for permitting bearing in the peripheral direction, and said projection engages in the undercut of the bridge limb.

3. The disk brake as claimed in claim 2, wherein a stop and a supporting means are provided on an outlet-side bridge limb such that the brake lining is configured to be supported radially by means of the supporting face and wherein the stops are spaced apart in the peripheral direction in the brake caliper such that when the brake disk rotates in the main rotational direction, the inlet-side stop is in exclusive engagement with the bearing face when moderate peripheral forces are induced by braking, and an outlet-side projection bears against the stop of the outlet-side bridge limb under the effect of deformation when there are high peripheral forces.

4. The disk brake as claimed in claim 3, wherein a supporting face is provided on the central support, wherein the supporting face bounds movement of the brake lining in the radial direction with play ($S_R$) in the brake caliper through interaction with supporting means of the bridge limbs.

5. The disk brake as claimed in claim 4, wherein a rear supporting face which interacts with the supporting face of the central support is provided on the brake lining, wherein the rear supporting face is arranged on a side of the rear region of the back plate facing away from a rotational axis of the brake disk, and substantially centrally between the projections.

6. The disk brake as claimed in claim 3, wherein an undercut for the outlet-side brake lining is formed on a bridge limb which accommodates the supporting means for the inlet-side brake lining.

7. The disk brake as claimed in claim 2, wherein the undercut is provided exclusively on the inlet-side, with respect to a main rotational direction of the brake disk, for each brake lining in the brake caliper, and the back plate has an L-shaped projection exclusively on the inlet-side such that a flow of force of peripheral forces from the back plate into the brake caliper occurs by means of tension via the bearing face and the stop when the brake disk rotates in the main rotational direction, and occurs by means of pressure via the bearing face and the stop when the brake disk rotates in a direction opposed to the main rotational direction.

8. The brake lining as claimed in claim 2, wherein the L-shaped projection is embodied exclusively on the inlet side, with respect to a main rotational direction of the brake disk, on the rear region of the back plate, such that a flow of force of peripheral forces from the back plate into the brake caliper occurs by means of tension via the bearing face when the brake disk rotates in the main rotational direction, and occurs by means of pressure via the bearing face when the brake disk rotates in a direction opposed to the main rotational direction.

9. The disk brake as claimed in claim 2, wherein a recess, which at least partially accommodates the central support, is provided in the brake lining, and wherein the rear supporting face is arranged in the recess of the brake lining.

10. The disk brake as claimed in claim 1, wherein the main supports and the central support enclose the brake disk in a U-shape.

11. The disk brake as claimed in claim 1, wherein a recess, which at least partially accommodates the central support, is provided in the brake lining.

12. The disk brake as claimed in claim 1, wherein at least two pairs of brake linings are provided next to each other in the peripheral direction in the brake caliper in order to act axially on both sides of the brake disk.

13. The disk brake as claimed in claim 1, wherein the caliper bridge is manufactured from a stronger material than the caliper limbs.

14. The disk brake as claimed in claim 1, wherein the caliper limbs are configured to be screwed to the caliper bridge and the bridge limbs at two radial locations such that the bridge limbs increase the rigidity of the brake caliper.

15. The disk brake as claimed in claim 1, wherein the brake caliper is embodied as a floating caliper or fixed caliper.

16. A set of brake linings for a disk brake according to claim 1, wherein at least two brake linings which are arranged one next to the other on the same side of the brake disk in the peripheral direction are embodied in the same way.

17. A brake lining for a disk brake having a brake caliper, wherein the brake caliper engages axially in a U-shape around a rotatable brake disk, and comprises a caliper bridge, two caliper limbs and at least one actuating device, wherein the brake lining is mounted in an axially movable fashion in the brake caliper, wherein the brake lining comprises a back plate and a friction lining which is arranged thereon, wherein a recess, which at least partially accommodates the caliper bridge, is provided in the back plate and in the friction lining of the brake lining, wherein the caliper bridge has, in a peripheral direction, at least three substantially axially extending supports, wherein the supports are embodied as two main supports and one central support which connect the caliper limbs forming two windows and axially project beyond the brake disk, wherein the central support axially projects beyond the brake disk and the brake lining and is accommodated on both sides by the recess in the peripheral direction.

18. The brake lining as claimed in claim 17, wherein the back plate has a rear region with two projections which adjoin in the peripheral direction, wherein at least one projection is embodied in an L-shape with a supporting face for providing radial support and two bearing faces for permitting bearing in a peripheral direction, and the at least one projection engages in an undercut in the caliper bridge, and the other projection has a further supporting face.

19. The brake lining as claimed in claim 18, wherein a rear supporting face is provided on the rear region, which rear supporting face bounds, through interaction with the supporting faces of the projections, a movement of the brake lining in the radial direction with play ($S_R$) in the brake caliper.

20. The brake lining as claimed in claim 19, wherein the rear supporting face is arranged in the recess of the brake lining.

* * * * *